UNITED STATES PATENT OFFICE.

GEORGE S. MORGAN, OF TOLEDO, OHIO.

PROCESS OF PRODUCING POTASSIUM SULFATE.

1,161,239.   Specification of Letters Patent.   Patented Nov. 23, 1915.

No Drawing.   Application filed June 7, 1915.   Serial No. 32,598.

*To all whom it may concern:*

Be it known that I, GEORGE S. MORGAN, a citizen of the United States, and a resident of Toledo, in the county of Lucas and State of Ohio, have invented a certain new and useful Process of Producing Potassium Sulfate; and I do hereby declare the following to be a full, clear, and exact description of the invention, such as will enable others skilled in the art to which it appertains to make and use the same.

My invention relates to processes of producing potassium sulfate from alunite. In the processes heretofore used in the production of potassium sulfate from alunite, sulfur dioxid gases and other vapors are produced which cause great injury to vegitation. In processes embodying my invention the alunite may be roasted at a temperature sufficient to cause the conversion of alunite into water-soluble potassium sulfate which may be subsequently leached from the roast and at the same time rendering all the other ingredients of the alunite and compounds formed, insoluble. Also, in the processes embodying my invention, the sulfur dioxid is taken up to form a sulfate compound thereby preventing any escape of the sulfur dioxid which otherwise would greatly injure vegetation surrounding the plant in which processes for forming potassium sulfate from alunite is conducted.

In the process embodying my invention alunite is roasted in a suitable furnace in the presence of calcium oxid or calcium hydrate at a temperature within certain limits and for a period of time which will be sufficient to cause a complete re-action while the mixture is being roasted.

In the conduct of the process, alunite is ground and is then mixed with calcium oxid or hydrate of lime in the proportion of about one of calcium hydrate to four of alunite. This proportion may be varied according to the quantity of aluminum in the alunite which is to be rendered insoluble; also, if calcium oxid is used in place of the calcium hydrate the ratio of the ingredients will be less. The mixture is then placed in a suitable furnace, preferably in a rotary furnace, the heat being directed into the discharging end of the furnace. The temperature of the mixture within the furnace is raised to 1200° to 1800° F. and the temperature is kept at this point until the re-action is complete as may be determined by analysis.

In the processes involving the use of my invention the temperature heretofore required to make the aluminum insoluble and the potassium sulfate soluble, may be greatly reduced.

After roasting, the roasted mixture is placed in leaching vats, while the roasted mixture is still hot. Water is then directed onto the roasted product in the leaching vats. The mixture is then agitated by the use of the live steam which causes the water to take up as much of the soluble potassium sulfate as possible. The water is then drawn off and directed into the next leaching vat where it is again agitated as before, the water taking up an additional amount of the soluble potassium sulfate. This process is repeated until the solution becomes concentrated at about 200° F. The solution is then directed into crystallizing vats where it is allowed to stand and cool. The solution may here be cooled by artificial means if desired in order to hasten the crystallization. The mother liquor is then drawn from the crystallizing vats and is then directed upon the vat in which is located the roasted product which has been leached the most. Thence the solution is directed to a vat wherein the roasted product has been leached to a less extent, that is, to the one which contains the next lesser amount of potassium sulfate still undissolved. The solution is then conducted through each of the vats in succession in this manner, until it is directed upon the product which has just come from the roasting furnace and has not yet been leached.

The potassium crystals are then removed from the crystallizing vats and may be dried and ground or otherwise treated as may be desired.

Having thus described my invention, what I claim as new, and desire to secure by Letters Patent, is,—

1. The process of forming soluble potassium sulfate from alunite and rendering the aluminum insoluble without the production of sulfur dioxid which consists in roasting the alunite in the presence of calcium oxid, leaching the roast, concentrating the leach and removing the potassium sulfate from the leach.

2. The process of forming potassium sulfate from alunite and rendering the aluminum insoluble, without the production of sulfur dioxid, which consists in roasting alunite in the presence of calcium oxid at a temperature of about 1200° to 1800° F., leaching the roast and removing the potassium sulfate from the leach.

In testimony whereof, I have hereunto signed my name.

GEORGE S. MORGAN.